United States Patent [19]

Patterson et al.

[11] Patent Number: 4,508,375

[45] Date of Patent: Apr. 2, 1985

[54] TUBULAR CONNECTION

[75] Inventors: Billy R. Patterson, Diana; Warren P. Schneider, Dallas, both of Tex.

[73] Assignee: Lone Star Steel Company, Dallas, Tex.

[21] Appl. No.: 420,475

[22] Filed: Sep. 20, 1982

[51] Int. Cl.³ .............................................. F16L 25/00
[52] U.S. Cl. .................................... 285/334; 285/390
[58] Field of Search ................ 285/333, 334, 355, 390

[56] References Cited

U.S. PATENT DOCUMENTS

| | | | |
|---|---|---|---|
| 2,062,407 | 12/1936 | Eaton | 285/334 X |
| 2,204,754 | 6/1940 | Frame | 285/334 X |
| 2,885,225 | 5/1959 | Rollins | |
| 3,224,799 | 12/1965 | Blose et al. | 285/334 |
| 3,307,860 | 3/1967 | Blount et al. | |
| 3,346,278 | 10/1967 | Yocum | 285/333 |
| 3,355,192 | 11/1967 | Kloesel, Jr. et al. | 285/334 X |
| 3,427,707 | 2/1969 | Nowosadko | |
| 3,572,777 | 3/1971 | Blose | 285/334 |

OTHER PUBLICATIONS

API Standard 5B.

Primary Examiner—Richard J. Scanlan, Jr.
Attorney, Agent, or Firm—Donald E. Degling

[57] ABSTRACT

The present invention relates to tubular connections for application to heavy wall, high performance casing in high pressure, critical service oil and gas wells. A threaded and coupled tubular connection is provided which comprises a male member and a female member having engageable threads disposed on respective first and second substantially matching tapers of about 1.750 inches per foot on the diameter. This taper provides increased female member wall thickness at the narrow end of the female taper; increases the perfect thread length; provides deeper stabbing of the male member into the female member; reduces leakage path clearances; and reduces the male member-in-female member position tolerance. The taper tolerances of the male and female thread tapers are staggered to provide a lower taper on the male member and a higher taper on the female member which results in an advantageous taper mismatch insuring sealing and interference within the made-up connection adjacent the narrow end of the male member.

4 Claims, 9 Drawing Figures

TUBULAR CONNECTION

BACKGROUND OF THE INVENTION

1. Field of the Invention

The present invention relates to tubular connections for application to heavy wall, high performance casing in high pressure, critical service oil and gas wells. More particularly, the present invention relates to such a connection having an improved taper and buttress type threads.

2. Description of the Prior Art

In recent years, oil and gas wells that have been drilled for exploration and production have commonly extended to depths in the range of 15,000 to 35,000 feet, where pressures and temperatures may exceed 15,000 psi and 250° F. respectively. These conditions not only require tubulars (commonly known as Oil Country Tubular Goods (OCTG)) having higher strength, higher reliability and better resistance to failure under higher loads and corrosive applications, such as are disclosed in commonly assigned U.S. Pat. No. 4,354,882, but also require tubular connections which have higher strength and better resistance to severe stress applications. There are three basic types of OCTG's, each of which makes its own contribution to the drilling and completion of oil and gas wells. These types of tubulars are drill pipe, casing and tubing. This invention is primarily intended as a superior connection for heavy wall casing.

Typically, the lengths of tubulars are threaded at each end and are joined together by an internally threaded coupling. The threads of both the tubes and the couplings must be able to carry the weight of the tubulars and couplings extending below it into the well and must also be able to withstand the high internal and external pressure encountered during drilling and producing of the wells. Since the casing commonly in use will have a weight of from 10 to in excess of 100 pounds per foot, the tensile loads which the threads in the uppermost casing connection must be able to withstand when there are 15,000 to 35,000 feet of tubulars and connections below it are tremendous.

With sufficiently high tensile loads, connections may fail due to rupture of the base metal within the connection or by sudden disengagement of the mated male and female threads. The latter of these failures is termed the "pull-out" mode of failure.

The casing connection must, of course, be leak-proof and a means of sealing must be provided. The threaded connections must be capable of being made up and disassembled without galling and without the danger of stripping threads or cross-threading. It is desirable after the joint is "stabbed" that it can be made up with a relatively small number of turns.

Two types of casing connections are in common use, coupled and integral joint. Coupled connections employ male threads on each end of the tube which are joined by a female threaded connector called a coupling. Tubes with male threads on one end and female threads on the other are referred to as integral joints since no couplings are required.

The following patents and publications illustrate the current state of the art.

Eaton U.S. Pat. No. 2,062,407 discloses a threaded pipe joint of the integral type which employs a buttress type thread having broad crests and roots and which is disclosed to have a reduced galling tendency (page 6, column 2, lines 48–50); easier and faster make-up (page 7, column 2, lines 28–40); and improved hoop strength at the end of the female section of the joint (page 3, column 2, lines 36–46).

Frame U.S. Pat. No. 2,204,754 discloses a threaded pipe joint of the integral type having a modified acme type thread wherein the thread crests and roots are flat and parallel to the axis of the joint (page 2, column 1, lines 34–42). Five threads per inch are provided and are tapered at both ends, but not in the middle of the thread length, between $\frac{3}{4}''$ and $1\frac{3}{4}''$ per foot (page 2, column 2, lines 21–27).

Rollins U.S. Pat. No. 2,885,225 discloses a drill pipe coupling employing a double thread having three to five threads per inch (column 2, lines 37–43) which is tapered about $1\frac{1}{2}''$ per foot (column 1, lines 63–67). This taper is said to result in easier and rapid make-up and to promote optimum stabbing (column 1, lines 65–67). The thread is provided with flat crests and roots which are parallel to the taper (column 4, lines 11–20).

Kloesel, Jr., et al., U.S. Pat. No. 3,355,192 discloses a pipe joint of the integral type having a modified buttress type double thread which is tapered $1\frac{1}{2}''$ per foot (column 3, lines 40–47, and see column 5, lines 40–45).

Yocum U.S. Pat. No. 3,346,278 discloses a tapered V-thread for pipe joints of the integral type wherein the external threads have a basic taper of between 20 percent and 80 percent of the basic taper of the internal threads (column 2, lines 25–28). This arrangement is said to produce a seal between the leading external threads and the innermost internal threads irrespective of whether either thread is at the extreme limits of the commercial taper tolerance (column 3, lines 34–40).

Nowosadko U.S. Pat. No. 3,427,707 discloses a non-threaded soldered pipe joint wherein the female member is machined to a larger taper than the male member so as to assure a seal at the leading end of the male member (column 2, lines 37–41).

Blose et al. U.S. Pat. No. 3,224,799 discloses a threaded tube joint of the integral type which employs a buttress type thread tapered about 1" per foot to permit deeper stabbing and more rapid make-up (column 2, lines 51–54; see also column 3, lines 44–47). U.S. Pat. No. 3,224,799 also suggests that the tolerance be such that the actual taper of the male threads will tend to be slightly deeper than that of the female threads (column 3, lines 47–55).

Blount et al. U.S. Pat. No. 3,307,860 discloses a pipe coupling having an internally thickened central region and shoulders against which a resilient sealing ring is compressed by a shoulder on the ends of the pipe (column 6, lines 36–51; see also column 4, lines 49–55). The threads are of a tapered modified buttress type (column 3, lines 13–15).

Blose et al. U.S. Pat. No. 3,572,777 discloses a pipe coupling thickened in the central region and provided with an internal groove for a resilient sealing ring which is compressed by the ends of the pipe (column 3, lines 1–18). The thread is of the acme or buttress type and is provided with a relatively steep taper (column 1, lines 5–16).

American Petroleum Institute (API) Standard 5B (March, 1979) discloses a tubular connection having a tapered buttress casing thread. The API tubular connection consists of a male joining element on the end of the pipe and a coupling member provided with cooperating female joining elements. The threads are on a taper of ¾" per foot on the diameter on sizes 13⅜" OD and smaller. The male joining element taper has a tolerance of from +0.0035 inch per inch to −0.0015 inch per inch. The female joining element taper has a tolerance of from +0.0045 inch per inch to −0.0025 inch per inch. The maximum disadvantageous taper spread (i.e., minus on coupling, plus on the pipe end) is 0.006 inch per inch. The API buttress threads have a substantially rectangular form with rounded corners and parallel crests and roots, a 0.200 inch thread pitch, a 3° load flank, 10° trailing flank, and a 0.062 inch thread height with a tolerance of plus or minus 0.001 inch.

The thread crests on the API male joining element threads have a length of 0.100 inch with a tolerance of from +0.000 inch to −0.003 inch (+0.000 inch to −0.005 inch on sizes 8⅝" and larger). The rounded corner on the load flank end of the crest has a radius of 0.008 inch with a tolerance of +0.002 to −0.000 and the rounded corner on the trailing flank end of the crest has a radius of 0.030 with a tolerance of from +0.002 to −0.000 inch. The roots have a length of 0.100 inch with a tolerance of from +0.003 to −0.000 inch (+0.005 to −0.000 on sizes 8⅝" or larger). The rounded corners on either end of the root have a radius of 0.008 inch with a tolerance of from +0.000 inch to −0.002 inch.

The crests of the API female joining element threads have a length of 0.099 inch with a tolerance of from 0.000 inch to −0.003 inch. The rounded corners at each end of the crest have a radius of 0.008 inch with a tolerance of from +0.002 inch to −0.000 inch. The roots have a length of 0.101 inch with a tolerance of +0.003 inch to −0.000 inch. The rounded corner of the load flank end of the root has a radius of from 0.008 inch with a tolerance of +0.000 inch to −0.002 inch. The rounded corner of the trailing flank end of the root has a radius of 0.030 inch with a tolerance of from +0.000 inch to −0.002 inch.

These API buttress thread tolerances result in a thread form that makes contact on the root and crest of the thread and the 3° load bearing flank, but which permits a clearance on the trailing 10° flank of as much as 0.007" on smaller diameter tubulars. This clearance forms a leakage path that must be sealed by the solids in the thread lube. The API taper of ¾" per foot results in 1.984" of imperfect (non-sealing threads) and, for a 7", nominal, outside diameter casing corresponds to a buttress thread length of 4.200 inches.

The present invention represents an improvement on this API tubular connection and, as compared to that connection, provides a reduced maximum mated thread clearance, combines less imperfect threads with an increase in overall thread length to provide a greatly increased leakage path, and an advantageous taper mismatch which provides high bearing pressure and sealing within the made-up joint adjacent the narrow end of the male member where the coupling is strongest.

BRIEF SUMMARY OF THE INVENTION

A threaded and coupled tubular connection is provided for application to heavy wall, high performance casing used in high pressure, critical service oil and gas wells. This connection for tubulars may be either an integral type connection or a threaded and coupled type connection and comprises a male member and a female member having engagable threads disposed on respective first and second substantially matching tapers of about 1.750 inches per foot on the diameter. This taper, as compared to the prior art API Standard 5B taper, provides increased female member wall thickness at the narrow end of the female taper, thereby increasing joint strength and internal yield strength of the connection; increases the perfect thread length, thereby enhancing leak resistance; provides deeper stabbing of the male member into the female member resulting in faster make-up and reduced galling; reduces leakage path clearances; and reduces the male member-in-female member position tolerance, thereby affording more accurate make-up. The taper tolerances of the male and female thread tapers are staggered to provide a lower taper on the male member and a higher taper on the female member which results in an advantageous taper mismatch insuring sealing and interference within the made-up connection adjacent the narrow end of the male member.

DETAILED DESCRIPTION OF THE INVENTION

Referring now to the drawings, in which like parts are given like reference characters throughout, the present invention will be described with reference to the threaded and coupled type joint embodiment with the understanding that the discussion of the taper, threads and tolerances applies equally to the integral type joint embodiment.

Figure 1:
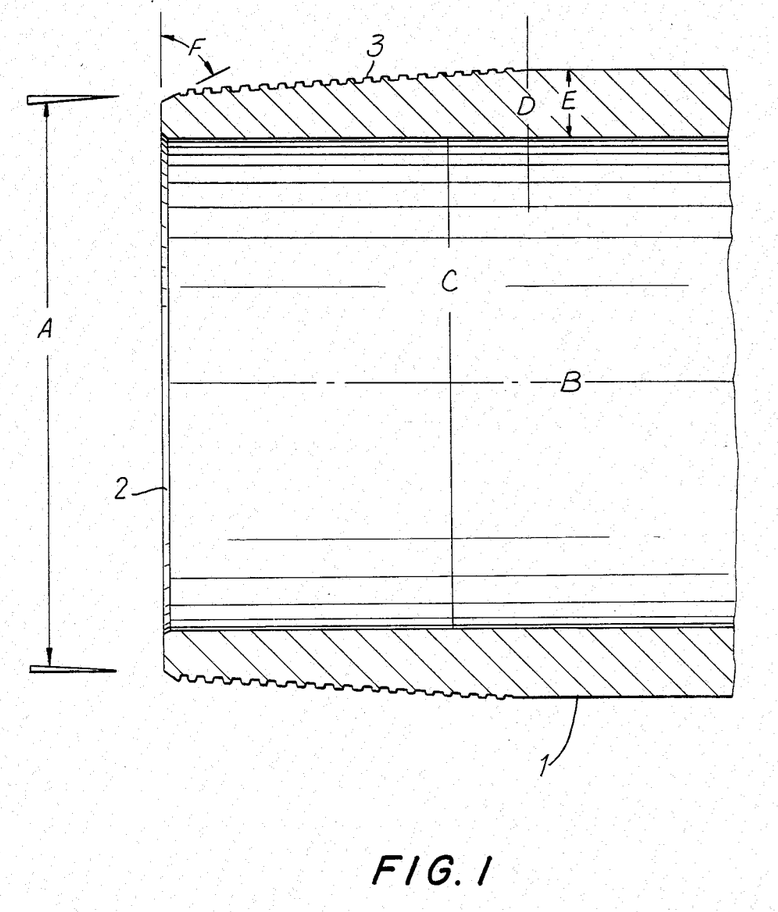
FIG. 1 is an enlarged longitudinal sectional view of the male member of the present invention.

Male member 1 has a threaded, tapered end 2 with buttress type threads 3. This taper, as represented by line A in FIG. 1, is 1.750 inches per foot on the diameter with a tolerance of +0.000 inch per inch to −0.003 inch per inch on the diameter. In FIG. 1, the central axis of the male member is represented by line B, the plane of perfect thread length is indicated by line C, the plane of the vanishing point is represented by line D and the wall thickness of the tubular is represented by line E. Preferably, the open end 2 of the tubular is beveled, as indicated by the angle F in FIG. 1, to avoid feathered ends. This bevel is typically 65°, although other angles may be employed provided that a compatible angle is employed on the open end of the female member.

Typically, the tubular will have an outside diameter within the range of from about 4½ inches to about 13⅜ inches and a wall thickness within the range of from about ½ inch to about 1¼ inches. Particularly preferred outer diameters are 5½" OD, 7" OD, 7⅝" OD and 9⅝" OD. The taper, the thread form, and the tolerances do not vary with the OD or wall thickness, but it may be necessary to vary the thread length.

In a particularly preferred embodiment, the tubular has an outside diameter of 7.016 inches, an internal diameter of 5.556 inches and a wall thickness E of 0.730 inches. The thread length from the plane of the vanishing point D to the open end 2 is 5.500 inches, with the portion between the plane D and the plane C being 0.850 inches and the portion between the plane C and the open end 2 being 4.650 inches.

Figure 2:
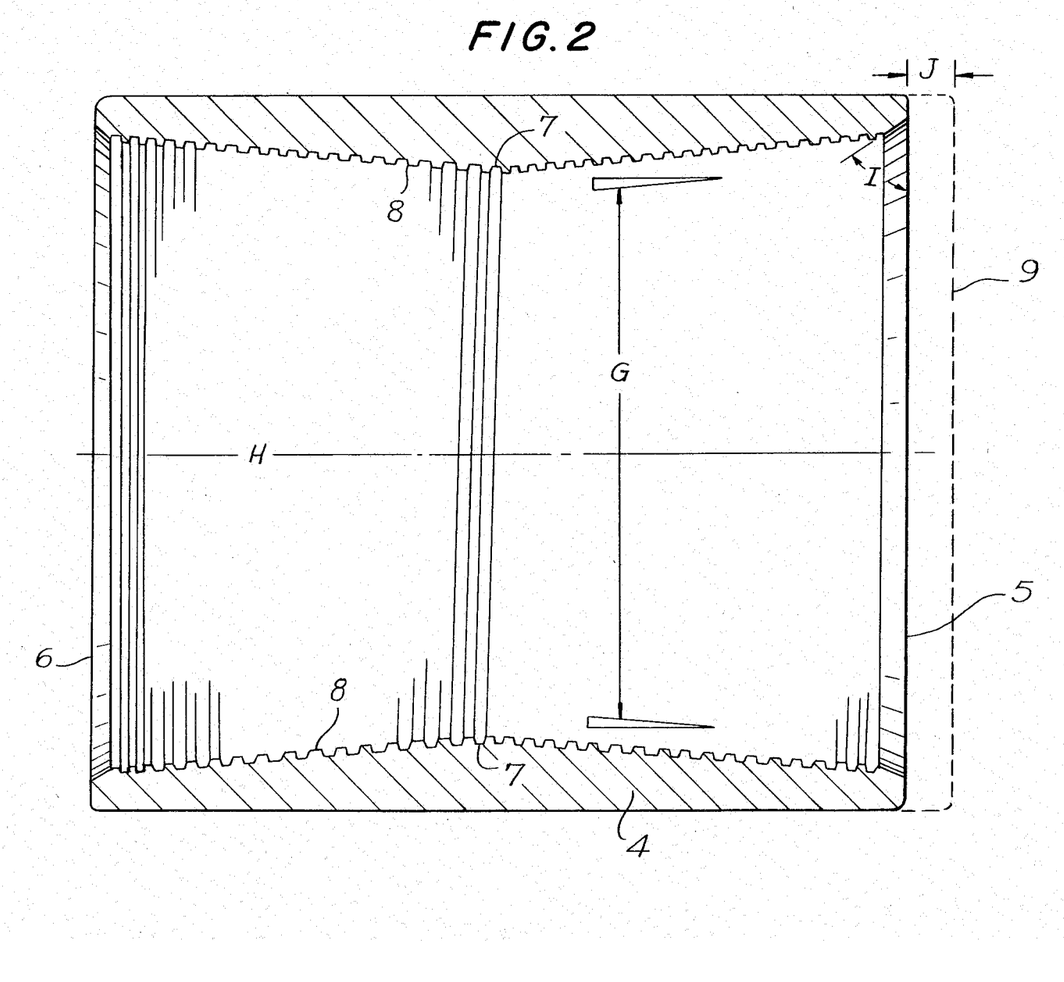
FIG. 2 is an enlarged longitudinal sectional view of a female coupling member of the present invention.

With reference to FIG. 2, the female coupling member 4 is a substantially tubular member having a bore extending axially therethrough and centered on the axis H. The bore is tapered from open ends 5 and 6 toward a central position 7 and is internally threaded with buttress type threads 8. The taper, as indicated at G, is 1.750 inches per foot on the diameter and has a tolerance of from +0.0045 inch per inch to −0.000 inch per inch on the diameter. Preferably, as indicated at I in FIG. 2, the open ends 5 and 6 of the female coupling members are beveled at the same angle as the bevel on the male member.

Figure 6:
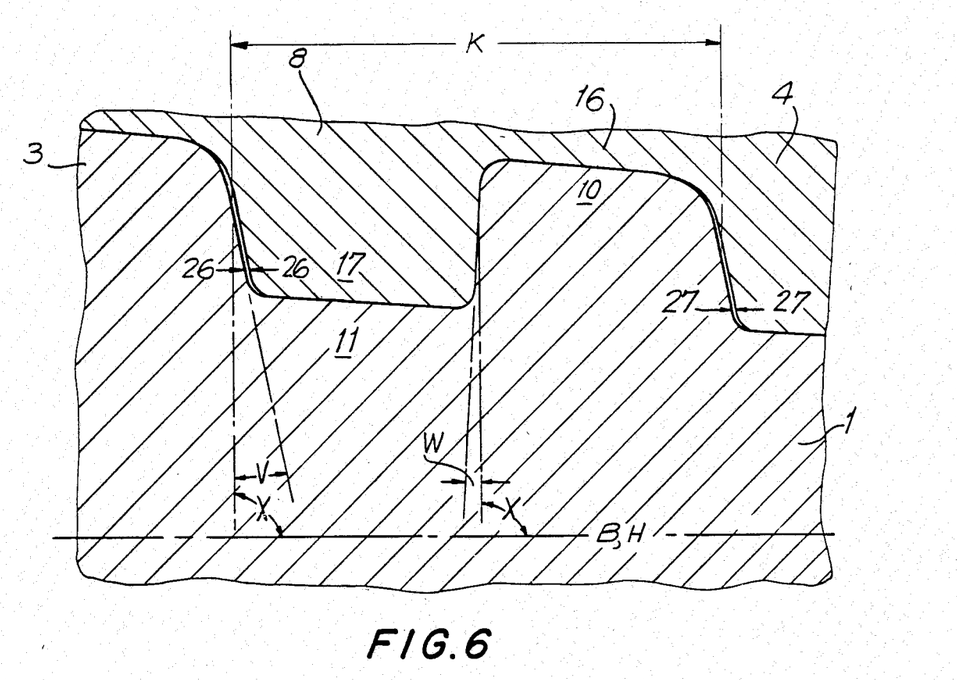
FIG. 6 is a view similar to FIG. 5 but showing the relative positions of the threads of the male member and the female member when the thread forms are at nominal clearance tolerances.

In practice, a threaded male member end of a first tubular is stabbed into either opening 5 or 6 of the female coupling member 4 such that the threads 3 engage threads 8. The threaded male member end of a second tubular is stabbed into the unoccupied opening of the female coupling member such that its threads engage the internal threads 8 and the first and second tubulars are rotated relative to the female coupling member to make up the joint. The engagement of the threads 3 with the threads 8 is shown in FIG. 6.

In a particularly preferred embodiment for use in conjunction with the preferred 7" OD tubular embodiment of the male member discussed above, the coupling is manufactured having an outside diameter of 8.000 inches with a tolerance of ±0.060 inch, a length of 13.00 inches (with stiffener ring) with a tolerance of from +0.050 inch to −0.000 inch, a thread length in excess of 5.500 inches, and is internally threaded to accept the threaded male end of the 7" OD tubular. The dimensions of the female coupling member will, of course, be complementary to the dimensions of the tubular and its threaded male ends. As these dimensions change, the thread form, taper, and tolerances do not vary but it may be necessary to vary the thread length or the outside diameter of the coupling or both.

Figure 7:
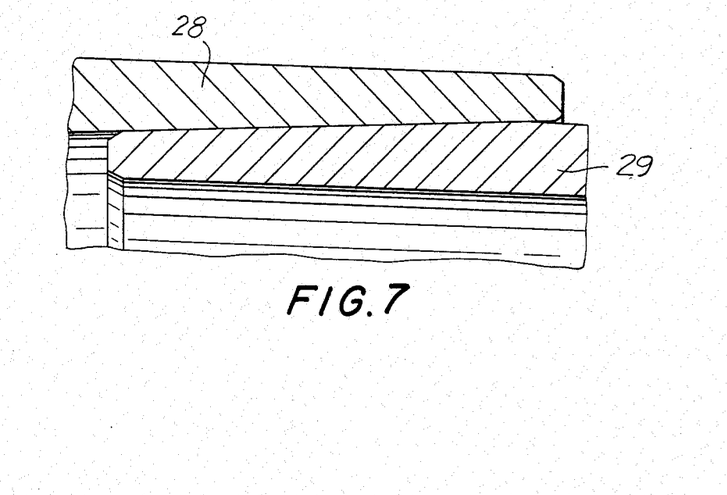
FIG. 7 is a fragmentary longitudinal section in schematic form of a made-up connection showing nominal matched tapers.
Figure 8:
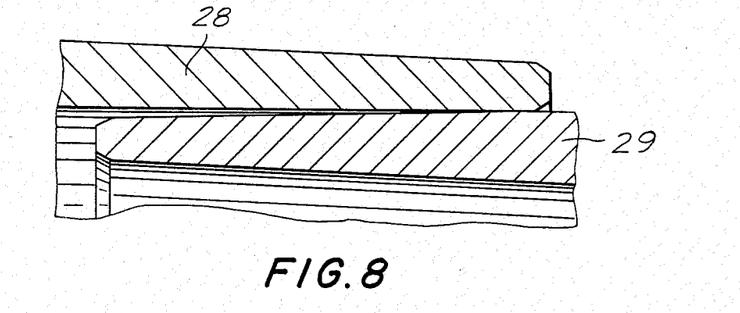
FIG. 8 is a view similar to FIG. 7 but showing disadvantageous taper mismatch.
Figure 9:
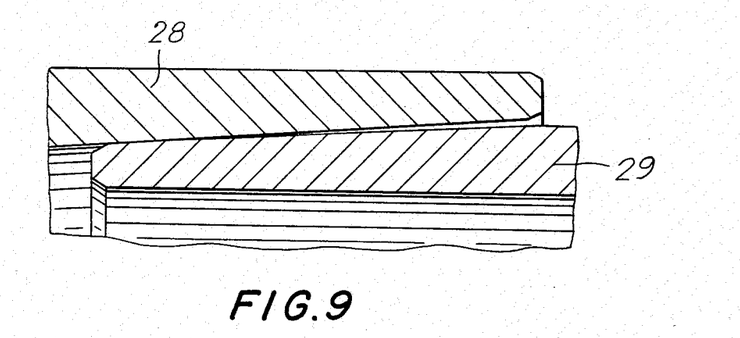
FIG. 9 is a view similar to FIG. 7 but showing the advantageous mismatch of the present invention.

The plus and minus tolerances of the first or male member 29 taper and the second or female member 28 taper are machined such that the taper on the male member is less than the taper on the female member. This provides a slight mismatch of the tapers as is shown schematically in FIG. 9. This mismatch is referred to as an advantageous mismatch and differs from the prior art tapers shown schematically in FIG. 7 in which tapers are matched and in FIG. 8 in which the tolerances are such that the tapers are slightly mismatched, providing a disadvantageous taper mismatch. The advantageous taper mismatch results in high bearing pressure and sealing within the joint adjacent the open or narrow end 2 of the male member, 29 which location is adjacent the thickest internal wall portion of the female member 28. Thus the bearing pressure and sealing are greatest where the joint is strongest.

An additional advantage present in the tubular connection of the present invention, which is not found in the API Standard 5B connection, results from the high taper of 1.750 inches per foot as opposed to the 0.750 inch per foot taper of the API connection. The higher taper of the present invention results in an imperfect (i.e., non-sealing) thread length of 0.850 inch as opposed to the 1.984 inches of imperfect threads in the API connector. This additional 1.134 inches of perfect threads greatly increases leak resistance and improves joint strength.

The strength of the threaded and coupling joint embodiment is increased by the optional inclusion of an unthreaded and recessed extension of the ends of the female coupling member as shown by the dashed line 9 in FIG. 2. This extension acts as a stiffener to reduce high tensile hoop stresses on the free ends of the female coupling member. As indicated by J in FIG. 2, this unthreaded extension, in the preferred embodiment, has a width of 0.500 inch. The female coupling member may also optionally include an integral non-threaded thickened wall in the center of the coupling which acts to increase coupling strength without restricting the flow path diameter of the mated connection and without increasing the outside diameter of the coupling. This feature would also increase coupling length.

The female coupling member 4 may also optionally include a resilient seal ring placed in a recess in the center of the female coupling member, as at 7. The inside surface of the ring has a smaller diameter than the center of the coupling member and is beveled outward on each side at an angle that matches the bevel F on the open ends 2 of the male members. The bevel causes the ring to be trapped in the female coupling member as soon as either or both male members are inserted in the female coupling member. The design and location of the single resilient seal ring allow it to effectively seal both pipe ends 2.

Yet another advantage of the tubular connection of the present invention, which is not found in the API connection, results from the restricted tolerances on the first or male member taper and the second or female member taper. The API coupling taper tolerances are +0.0045 inch per inch to −0.0025 inch per inch on the female member and +0.0035 inch per inch to −0.0015 inch per inch on the male member. Thus the maximum disadvantageous taper (i.e., minus on the female member, plus on the male member) for the API connection is 0.006 inch per inch whereas the maximum disadvantageous taper for the connection of the present invention is 0.000 inch per inch. This, in conjunction with the staggered plus and minus tolerances noted above, assures obtaining high bearing pressure and sealing within the made-up joint between the male member and the female member adjacent the narrow end of the male member, where the coupling is strongest.

An additional advantage which derives from the increased taper of 1.750 inches as opposed to the 0.750 taper of the API connection is a greater perfect thread length which increases the length of the leakage path and also increases the strength of the joint. For a 7" OD 0.730" wall casing, the thread length is 5.500 inches as opposed to 4.200 inches for the API connection.

Figure 3:
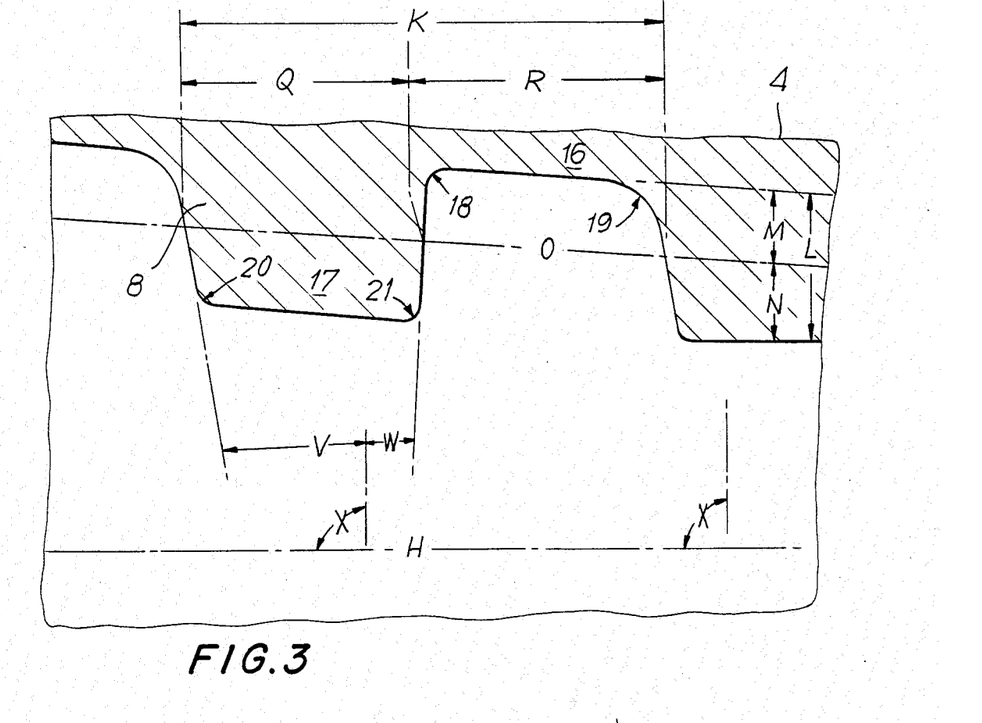
FIG. 3 is a greatly enlarged fragmentary longitudinal section illustrating the threads on the female member.
Figure 4:
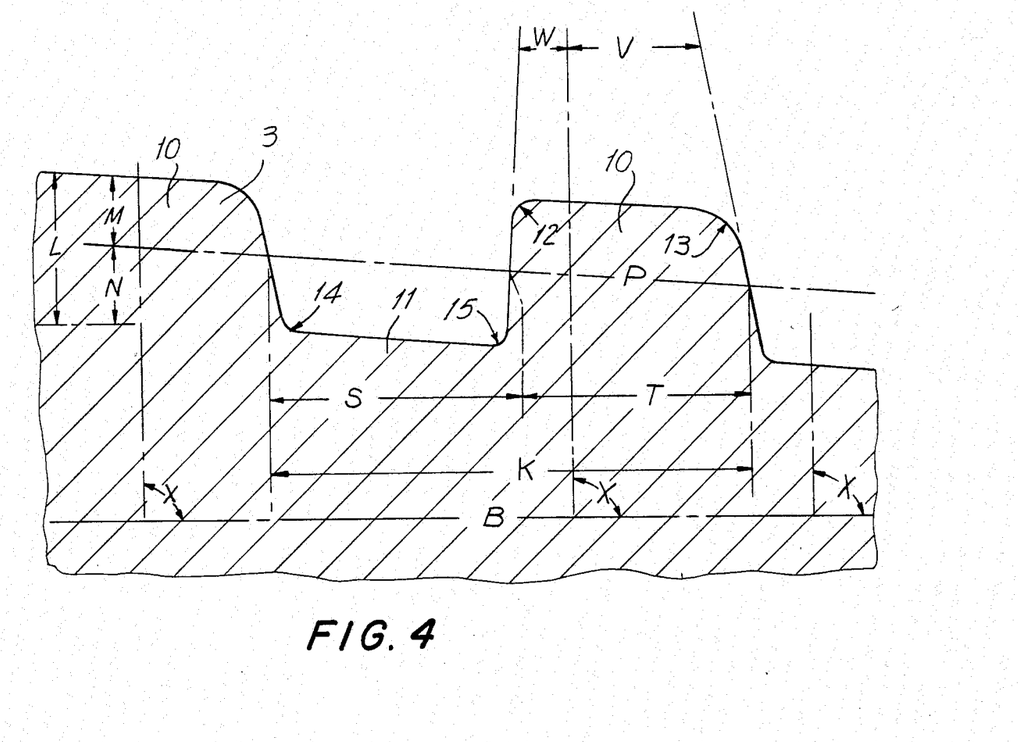
FIG. 4 is a greatly enlarged fragmentary longitudinal section illustrating the threads on the male member.
Figure 5:
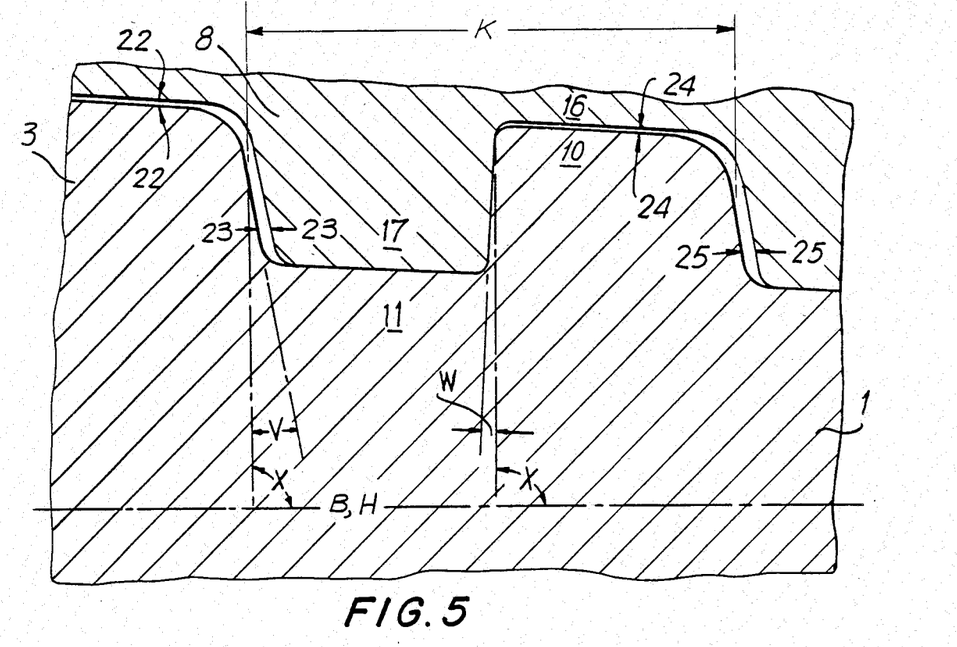
FIG. 5 is a greatly enlarged fragmentary longitudinal section of a made-up tubular connection of the present invention illustrating the relative positions of the threads on the male member and female member when the thread forms are at maximum clearance tolerances.

In FIGS. 3, 4 and 5 all 90° angles between reference lines and axes are indicated by X.

With reference to FIG. 3, the threads 8 on the interior of the female member have a substantially rectangular form with rounded corners and parallel crests and roots which are also parallel to the pitch line O. The threads have a 0.200 inch thread pitch K (5 threads per inch), a 3° load flank W, and a 10° trailing flank V and a 0.062 inch thread height L with a tolerance of from +0.001 inch to −0.001 inch. As shown in FIG. 3, the distances represented by M and N are each 0.031 inch. The crest 17 has a length Q of 0.099 inch with a tolerance of from +0.000 inch to −0.001 inch. The rounded corner 20 at the trailing flank end of crest 17 and the rounded corner 21 at the load flank end of crest 17 each have a radius of 0.008 inch with a tolerance of from +0.002 inch to −0.000 inch. The roots 16 have a length R of 0.101 inch with a tolerance of from +0.001 inch to −0.000 inch. The rounded corner 18 at the load flank end of root 16 has a radius of 0.008 inch with a tolerance of from +0.000 inch to −0.002 inch. The rounded corner 19 on the trailing flank end of root 16 has a radius of 0.030 inch with a tolerance of from +0.000 inch to −0.002 inch.

With regard to FIG. 4, the threads 3 on the male member also have a substantially rectangular form with rounded corners and parallel crests 10 and roots 11 which are parallel to pitch line P. As indicated by L, M, and N, the thread height of threads 3 is the same as the thread height of threads 8 on the female member. As indicated by W and V, the load flanks and trailing flanks of the threads 3 are 3° and 10°, respectively, and thus are the same as for the female member 4. As indicated by K, the thread pitch is 0.200 inch which is the same as the thread pitch of threads 8 on the female member. The roots 11 have a length S of 0.101 inch with a tolerance of from +0.001 inch to −0.000 inch. The rounded corner 14 on the trailing flank end of root 11 and the rounded corner 15 on the load flank end of root 11 each have a radius of 0.008 inch with a tolerance of from +0.000 inch to −0.002 inch. The crests 10 have a length T of 0.099 inch with a tolerance of from +0.000 inch to −0.001 inch. The rounded corner 12 on the load flank end of crest 10 has a radius of 0.008 inch with a tolerance of from +0.002 to −0.000 inch. The rounded corner 13 on the trailing flank end of crest 10 has a radius of 0.030 inch with a tolerance of from +0.002 inch to −0.000 inch.

The root and crest tolerances of the threads 3 on the male member and the threads 8 on the female member are restricted as compared to the API Standard 5B thread tolerances and result in a thread form, as shown in FIG. 5, which permits a maximum trailing flank clearance of 0.004 inch, as shown at 23—23 and 25—25, and a maximum root and crest clearance of 0.002 inch, as shown at 22—22 and 24—24. In FIG. 6, the nominal clearance on the trailing flank is 0.002 inch as shown at 26—26 and 27—27 and the clearance between the crests and roots is substantially zero.

The API Standard 5B thread tolerances result in a thread form that makes contact on the root and crest of the thread and the 3° load bearing flank, but permits a clearance on the trailing 10° flank of as much as 0.007 inch on smaller diameter tubulars. This clearance forms a leakage path that must be sealed by the solids in the thread lube whereas the maximum 0.004 inch trailing flank clearance of the connection of the present invention reduces the size of the maximum leakage clearance, as compared to the API connection, by approximately 43%. Thus, as compared to the API Standard 5B tubular connection, the tubular connection of the present invention has increased coupling wall thickness at the narrow end of the female taper which results in increased joint strength and increased internal yield strength for the connection.

The tubular connection of the present invention has greater perfect thread length which enhances leak resistance and provides significant increases in joint strength. For example, on 7" OD, 0.730" wall casing there is a 110% increase in perfect thread length. The greater taper of the present invention provides for deeper stabbing of the male member into the female member resulting in faster make-up and reduced galling, and the restricted thread tolerances result in a 43% smaller cross-sectional leakage path area as compared to the API connection and a reduced male member-in-female member position tolerance affording more accurate make-up. The joint strength of the tubular connection of the present invention will, in most cases, exceed the pipe body yield strength.

The tubular connection of the present invention can be made for special clearances and is field shop repairable.

In order to disclose more clearly the nature of the present invention, the following laboratory tests illustrating the advantages of the tubular connection of the present invention are given. It should be understood, however, that this is intended neither to delineate the scope of the invention nor limit the ambit of the appended claims.

LABORATORY TESTS

The following tests were performed on 7" OD, 0.730" wall, casing have a 90,000 psi minimum yield strength and a 5.000" thread length.

Maximum and Minimum Make-Up and Torque Determination

Male members were made up into female members containing either zinc or tin plated threads to predetermined positions in order to establish proper make-up and torque for desired performance. The made-up tubular connection was subjected to a hydrostatic pressure test to approximately 100% of nominal API internal yield pressure (17,830 psi) based upon minimum yield strength and 95% remaining wall. Following the test, the couplings were cut open to detect thread damage.

Results: Ten male members and five female members were tested. Make-up ranged from approximately 2,800 ft-lbs to 15,900 ft-lbs and turns past reference torque (1,000 ft-lbs) from 0.75 turns to 3.062 turns. No connections leaked and no thread damage occurred. In practice, make-up typically ranges from 5,000 ft-lbs to 8,000 ft-lbs and thus the test range was extended by reducing the lower limit by about 50% and increasing the upper limit by about 50%. Surprisingly, no connections leaked even at the relatively very low torque of 2,800 ft-lbs.

TENSILE TESTS TO FAILURE

Male members and female members were made up and axially loaded to failure.

Results: Eight specimens were tested. Ultimate failure occurred from 104.8% to 117.7% of nominal axial body yield or from 103.7% to 116.5% of nominal API buttress joint strength ratings. In some joints, the failure occurred in the threads of the male member, which stripped, whereas in others, the female threads stripped, and in one other the failure occurred not in the joint but due to the body of the tubular being pulled away from the connection. This indicates that there is a good balance between the strength of the tubular and the strength of the connection.

HYDROSTATIC PRESSURE TEST

Male members were made up into female members containing either zinc-plated or tin-plated threads and hydrostatic pressure tested to approximately 100% of nominal API internal yield pressure (17,830 psi) based upon minimum yield strength and 95% remaining wall, for three cycles of five minutes at maximum pressure per cycle. The actual pressure rating employed was 17,800 psi which is in excess of the nominal API internal yield pressure (16,430 psi) based upon minimum yield strength and 87.5% remaining wall.

Results: Nine specimens were tested and no leakage occurred. One specimen was accidentally tested to 18,500 psi without leakage.

COMBINED LOADING

Male members and female members were made up and subjected to combined loads of internal pressure, axial tension and bending to simulate downhole conditions. Maximum loads imposed were 15,020 psi internal pressure (API nominal hydrotest pressure), 1,035,000 pounds axial tension (80% of nominal pipe body yield strength) and 10° per 100 feet two-dimensional bending. Two specimens were tested to 6° per 100 feet bending and two specimens were tested to 10° per 100 feet bending.

Results: Four specimens were tested. No leakage occurred.

GAS TESTS

Male members and female members were made up and subjected to 16,430 psi internal pressure (nominal API defined ratings) with dry nitrogen gas for one hour.

Results: Two specimens were tested. No leakage occurred.

MAKE-BREAK TEST

Male members and female members containing either zinc-plated or tin-plated threads were made up to the power-tight position and broken out three times.

Results: Five specimens were tested. All specimens were free of thread damage after three cycles of make-up and break-out.

The terms and expressions which have been employed are used as terms of description and not of limitation, and there is no intention in the use of such terms and expressions of excluding any equivalents of these features shown and described or portions thereof, but it is recognized that various modifications are possible within the scope of the invention claimed.

We claim:

1. A joint for heavy wall, high performance tubulars comprising:
   a male member and a female member having engagable threads disposed on respective first and second substantially matching tapers of about 1.750 inches per foot on diameter,
   said first taper having a tolerance of from +0.000 inch per inch to −0.003 inch per inch on diameter, said second taper having a tolerance of from +0.0045 inch per inch to −0.000 inch per inch on diameter, the plus and minus tolerances of the first and second tapers being such that the taper on the male member is less than the taper on the female member,
   said threads on the first taper having a substantially rectangular form with rounded corners and parallel crests and roots, said crests and roots being parallel to the plane of the first taper, a 0.200 inch thread pitch, a 3° load flank, a 10° trailing flank, and a 0.062 inch thread height with a tolerance of from +0.001 inch to −0.001 inch, said first taper thread crests having a length of 0.099 inch with a tolerance of from +0.000 inch to −0.001 inch, the rounded crest corner on the load flank end having a radius of 0.008 inch with a tolerance of from +0.002 inch to −0.000 inch, and the rounded crest corner on the trailing flank end having a radius of 0.030 inch with a tolerance of from +0.002 inch to −0.000 inch, said first taper thread roots having a length of 0.101 inch with a tolerance of from +0.001 inch to −0.000 inch, the rounded root corners on the load and the trailing flank ends having a radius of 0.008 inch with a tolerance of from +0.000 inch to −0.002 inch,
   said threads on the second taper having a substantially rectangular form with rounded corners and parallel crests and roots, said crests and roots being parallel to the plane of the second taper, a 0.200 inch thread pitch, a 3° load flank, a 10° trailing flank, and a 0.062 inch thread height with a tolerance of from +0.001 inch to −0.001 inch, said second taper thread crests having a length of 0.099 inch with a tolerance of +0.000 inch to −0.001 inch, the rounded crest corners on the load and the trailing flank ends having a radius of 0.008 inch with a tolerance of from +0.002 inch to −0.000 inch, said second taper thread roots having a length of 0.101 inch with a tolerance of from +0.001 inch to −0.000 inch, the rounded root corner on the load flank end having a radius of 0.008 inch with a tolerance of from +0.000 inch to −0.002 inch, and the rounded root corner on the trailing flank end having a radius of 0.030 inch with a tolerance of from +0.000 inch to −0.002 inch,
   whereby, as compared with the joint of API Standard 5B an improved joint is provided having an advantageous taper mismatch providing higher bearing pressure and sealing within the made-up joint adjacent the narrow end of the male member, a reduced maximum mated thread clearance, less imperfect thread length with an increase in overall thread length to provide a greatly increased leakage path, increased wall thickness of the female member at the narrow end of the second taper, deeper stabbing, and reduced male member-in-female member position tolerance.

2. The joint of claim 1 wherein the male member is an end of an elongate tubular and the female member is a coupling adapted to join two of said male members in axial alignment.

3. The joint of claim 1 wherein the male member is an end of a first elongate tubular and the female member is an end of a second elongate tubular.

4. The joint of claim 2 or 3 wherein the tubular has an outside diameter within the range of from about 4½ inches to about 13⅜ inches and a wall thickness within the range of from about ½ inch to about 1¼ inches.

* * * * *